US007632572B2

(12) United States Patent
Glenn et al.

(10) Patent No.: US 7,632,572 B2
(45) Date of Patent: Dec. 15, 2009

(54) DOUBLE SILVER LOW-EMISSIVITY AND SOLAR CONTROL COATINGS

(75) Inventors: Darin Glenn, Hampton, IA (US); Herb Johnson, Kingsport, TN (US); Rand Dannenberg, Benicia, CA (US); Peter A. Sieck, Santa Rosa, CA (US); Joe Countrywood, Napa, CA (US)

(73) Assignee: AGC Flat Glass North America, Inc., Kingsport, TN (US)

(*) Notice: Subject to any disclaimer, the term of this patent is extended or adjusted under 35 U.S.C. 154(b) by 0 days.

(21) Appl. No.: 11/745,243

(22) Filed: May 7, 2007

(65) Prior Publication Data

US 2007/0207327 A1 Sep. 6, 2007

Related U.S. Application Data

(63) Continuation of application No. 10/355,018, filed on Jan. 31, 2003, now abandoned, which is a continuation of application No. 09/944,372, filed on Sep. 4, 2001, now abandoned.

(51) Int. Cl.
*B32B 17/06* (2006.01)
*B32B 9/00* (2006.01)
*B05D 7/00* (2006.01)

(52) U.S. Cl. .................... 428/434; 428/469; 427/404; 427/419.1

(58) Field of Classification Search ........................ None
See application file for complete search history.

(56) References Cited

U.S. PATENT DOCUMENTS 3,034,924 A  5/1962  Kraus et al.

(Continued)

FOREIGN PATENT DOCUMENTS

EP    0 275 474 A1    7/1988

(Continued)

OTHER PUBLICATIONS

Fujii, K., et al., "Development of oxidation resistant SiC/C compositionally gradient materials", Japan Atomic Energy Research Inst., Tokyo, Jan. 1994, 19 pp., w/Abstract., Report No. JAERI-M-94-001.

(Continued)

*Primary Examiner*—Timothy M Speer
(74) *Attorney, Agent, or Firm*—Oblon, Spivak, McClelland, Maier & Neustadt, L.L.P.

(57) ABSTRACT

A low-emissivity multilayer coating includes, in order outward from the substrate, a first layer including a layer containing titanium oxide, a layer containing silicon nitride, or a sublayer layer containing titanium oxide in combination with a sublayer containing silicon nitride; a second layer including Ag; a third layer including at least one layer selected from titanium oxide layers and silicon nitride layers; a fourth layer including Ag; and a fifth layer including silicon nitride. The color of the coatings can be varied over a wide range by controlling the thicknesses of the layers of titanium oxide, silicon nitride and Ag. A diffusion barrier of oxidized metal protects relatively thin, high electrical conductivity, pinhole free Ag films grown preferentially on zinc oxide substrates. Oxygen and/or nitrogen in the Ag films improves the thermal and mechanical stability of the Ag. Dividing the first layer of titanium oxide, the Ag layers, and/or the third layer with a sublayer of oxidized metal can provide greater thermal and mechanical stability to the respective layers.

25 Claims, 4 Drawing Sheets

U.S. PATENT DOCUMENTS

| | | |
|---|---|---|
| 3,682,528 A | 8/1972 | Apfel et al. |
| 3,837,894 A | 9/1974 | Tucker, Jr. |
| 4,179,181 A | 12/1979 | Chang |
| 4,450,201 A | 5/1984 | Brill et al. |
| 4,462,883 A | 7/1984 | Hart |
| 4,534,841 A | 8/1985 | Hartig et al. |
| 4,610,771 A | 9/1986 | Gillery |
| 4,716,086 A | 12/1987 | Gillery et al. |
| 4,732,801 A | 3/1988 | Joshi |
| 4,782,216 A | 11/1988 | Woodard |
| 4,786,563 A | 11/1988 | Gillery et al. |
| 4,786,783 A | 11/1988 | Woodard |
| 4,790,922 A | 12/1988 | Huffer |
| 4,799,745 A | 1/1989 | Meyer et al. |
| 4,806,220 A | 2/1989 | Finley |
| 4,811,191 A | 3/1989 | Miller |
| 4,828,346 A | 5/1989 | Jacobsen et al. |
| 4,834,857 A | 5/1989 | Gillery |
| 4,859,532 A | 8/1989 | Oyama et al. |
| 4,861,669 A | 8/1989 | Gillery |
| 4,894,290 A | 1/1990 | Chesworth et al. |
| 4,898,789 A | 2/1990 | Finley |
| 4,898,790 A | 2/1990 | Finley |
| 4,900,633 A | 2/1990 | Gillery |
| 4,902,580 A | 2/1990 | Gillery |
| 4,948,677 A | 8/1990 | Gillery |
| 4,965,121 A | 10/1990 | Young et al. |
| 5,028,759 A | 7/1991 | Finley |
| 5,071,206 A | 12/1991 | Hood et al. |
| 5,073,451 A | 12/1991 | Iida et al. |
| 5,087,525 A | 2/1992 | Goodman et al. |
| 5,110,662 A | 5/1992 | Depauw et al. |
| 5,130,183 A | 7/1992 | Muromachi et al. |
| 5,183,700 A | 2/1993 | Austin |
| 5,201,926 A | 4/1993 | Szczyrbowski et al. |
| 5,229,194 A | 7/1993 | Lingle et al. |
| 5,234,748 A | 8/1993 | Demiryont et al. |
| 5,246,545 A | 9/1993 | Ampulski et al. |
| 5,279,722 A | 1/1994 | Szczyrbowski et al. |
| 5,296,302 A | 3/1994 | O'Shaughnessy et al. |
| 5,302,449 A | 4/1994 | Eby et al. |
| 5,318,685 A | 6/1994 | O'Shaughnessy |
| 5,324,365 A | 6/1994 | Niwa |
| 5,332,888 A | 7/1994 | Tausch et al. |
| 5,342,675 A | 8/1994 | Kobayashi et al. |
| 5,344,718 A | 9/1994 | Hartig et al. |
| 5,346,770 A | 9/1994 | Osada et al. |
| 5,376,455 A | 12/1994 | Hartig et al. |
| 5,377,045 A | 12/1994 | Wolfe et al. |
| 5,399,435 A | 3/1995 | Ando et al. |
| 5,407,733 A | 4/1995 | Bjornard et al. |
| 5,411,794 A | 5/1995 | Kawaguchi et al. |
| 5,413,864 A | 5/1995 | Miyazaki et al. |
| 5,480,722 A | 1/1996 | Tomonaga et al. |
| 5,506,037 A | 4/1996 | Termath |
| 5,514,476 A | 5/1996 | Hartig et al. |
| 5,514,485 A | 5/1996 | Ando et al. |
| 5,519,278 A | 5/1996 | Kahn et al. |
| 5,520,996 A | 5/1996 | Balian et al. |
| 5,521,765 A | 5/1996 | Wolfe |
| 5,532,062 A | 7/1996 | Miyazaki et al. |
| 5,543,229 A | 8/1996 | Ohsaki et al. |
| 5,557,462 A | 9/1996 | Hartig et al. |
| 5,563,734 A | 10/1996 | Wolfe et al. |
| 5,573,839 A | 11/1996 | Beaufays et al. |
| 5,584,902 A | 12/1996 | Hartig et al. |
| 5,591,529 A | 1/1997 | Braatz et al. |
| 5,591,533 A | 1/1997 | Pinarbasi |
| 5,595,825 A | 1/1997 | Guiselin |
| 5,616,423 A | 4/1997 | Sanjyou et al. |
| 5,671,914 A | 9/1997 | Kalkhoran et al. |
| 5,677,065 A | 10/1997 | Chaussade et al. |
| 5,688,585 A | 11/1997 | Lingle et al. |
| 5,709,930 A | 1/1998 | DePauw |
| 5,718,980 A | 2/1998 | Koch et al. |
| 5,770,321 A | 6/1998 | Hartig et al. |
| 5,776,603 A | 7/1998 | Zagdoun et al. |
| 5,780,149 A | 7/1998 | McCurdy et al. |
| 5,800,933 A | 9/1998 | Hartig et al. |
| 5,821,001 A | 10/1998 | Arbab et al. |
| 5,830,252 A | 11/1998 | Finley et al. |
| 5,834,103 A | 11/1998 | Bond et al. |
| 5,837,108 A | 11/1998 | Lingle et al. |
| 5,837,361 A | 11/1998 | Glaser et al. |
| 5,891,556 A | 4/1999 | Anderson et al. |
| 5,935,701 A | 8/1999 | Nishimura |
| 5,935,702 A | 8/1999 | Macquart et al. |
| 5,935,716 A | 8/1999 | McCurdy et al. |
| 5,939,201 A | 8/1999 | Boire et al. |
| 5,942,319 A | 8/1999 | Oyama et al. |
| 5,942,338 A | 8/1999 | Arbab et al. |
| 5,948,538 A | 9/1999 | Brochot et al. |
| 5,952,084 A | 9/1999 | Anderson et al. |
| 5,962,115 A | 10/1999 | Zmelty et al. |
| 5,965,246 A | 10/1999 | Guiselin et al. |
| 6,014,872 A | 1/2000 | Hartig et al. |
| 6,020,077 A | 2/2000 | Schicht et al. |
| 6,042,934 A | 3/2000 | Guiselin et al. |
| 6,045,896 A | 4/2000 | Boire et al. |
| 6,059,909 A | 5/2000 | Hartig et al. |
| 6,060,178 A | 5/2000 | Krisko |
| 6,068,914 A | 5/2000 | Boire et al. |
| 6,114,043 A | 9/2000 | Joret |
| 6,132,881 A | 10/2000 | Hartig et al. |
| 6,159,607 A | 12/2000 | Hartig et al. |
| 6,165,598 A | 12/2000 | Nelson |
| 6,180,247 B1 | 1/2001 | Szczyrbowski et al. |
| 6,190,776 B1 | 2/2001 | Demiryont |
| 6,210,784 B1 | 4/2001 | Rondeau et al. |
| 6,231,999 B1 | 5/2001 | Krisko |
| 6,238,781 B1 | 5/2001 | Anderson et al. |
| 6,277,507 B1 | 8/2001 | Anzaki et al. |
| 6,287,675 B1 | 9/2001 | Guiselin et al. |
| 6,306,525 B1 | 10/2001 | Schicht et al. |
| 6,316,111 B1 | 11/2001 | Krisko |
| 6,340,529 B1 | 1/2002 | Ebisawa et al. |
| 6,472,636 B1 | 10/2002 | Baldwin |
| 6,492,619 B1 | 12/2002 | Sol |
| 6,495,251 B1 | 12/2002 | Arbab et al. |
| 6,524,714 B1 | 2/2003 | Neuman et al. |
| 6,572,940 B1 | 6/2003 | Noethe et al. |
| 6,576,349 B2 | 6/2003 | Lingle et al. |
| 6,602,608 B2 | 8/2003 | Stachowiak |
| 2003/0049464 A1 | 3/2003 | Glenn et al. |
| 2003/0148115 A1 | 8/2003 | Glenn et al. |
| 2006/0147727 A1 | 7/2006 | Glenn et al. |

FOREIGN PATENT DOCUMENTS

| | | |
|---|---|---|
| EP | 0 303 109 A2 | 2/1989 |
| EP | 0 336 257 A2 | 10/1989 |
| EP | 0 543 077 A1 | 5/1993 |
| EP | 0 747 330 A1 | 12/1996 |
| EP | 0 761 618 A1 | 3/1997 |
| EP | 0 999 192 A1 | 5/2000 |
| GB | 2 229 737 A | 10/1990 |
| JP | 07-169126 | 7/1995 |
| JP | 2001-343510 | 12/2001 |
| WO | WO90/05439 | 5/1990 |

| | | |
|---|---|---|
| WO | 99/00528 | 1/1999 |

OTHER PUBLICATIONS

Jiang, Hong Ming, et al., "Experimental study for transparent heat-reflecting glass-coating", 1st World Renewable Energy Congress, Reading (UK), Sep. 23-28, 1990, (World Meeting No. 903 0430) (Index ref.).

Jankowski, A.F., et al., "Reactive sputtering of molybdenum-oxide gradient-index filters", (Lawrence Livermore National Lab., CA. Sponsor: Dept. of Energy, Washington, DC, Aug. 1990, 25 pp., Report No. UCRLJC103668, CONF901035-4 (abstract)). Paper: American Vacuum Society 37th Annual Symposium and Topical Conferences, Oct. 8-12, 1990, Toronto, CAN.

Hahs, T. S., "Antireflecting Film Development. Final Report", (Owens-Illinois, Inc., Toledo, OH, Corp. Tech. Div. Sponsor: Dept. of Energy, Washington, DC, May 11, 1981 (Abstract)). Report: UCRL-15373, Prepared for H. Lowdermilk, Lawrence Livermore Laboratory, UC-Livermore, CA. Tech. Ctr. Report: Owens-Illinois, Inc., Corporate Tech. 14 pp. (1981).

Stachiw, J. D., et al., "Resistance of Coated and Uncoated IR Window to Seawater Corrosion. Phase V. Summary", Technical Report, Naval Ocean Systems Center, San Diego, CA, Feb. 1, 1981 61 pp. w/Abstract. (Report: NOSC/TR-633).

Iwamura, Eiji, et al., "Effect of aluminium oxide caps on hillock formation in aluminium alloy films", Thin Solid Films, vol. 349, issues 1-2, Jul. 30, 1999, pp. 191-198 (Abstract only).

Passeggi Jr., M. C. G., et al., Passivation and temperature effects on the oxidation process of titanium thin films, Surface Science, Jun. 2002, vol. 507-510, issue 4, (Abstract only).

Chen, Haydn, "Oxide and nitride thin films; processing and characterization", Materials Science Forum, vol. 437-438, 193, 2003. Conf. info: 2nd Intern'l Conf. on Adv. Mat. Processing, Singapore, Dec. 2-4, 2002 (Abstract only).

Ruegg, B., et al., "New Low-E-Layersystems based on $TiO_2$ in Coating of Architectural Glass", Sonderdruckaus Glas-Ingenieur 7, Leybold Systems GmbH (1997).

Szczyrbowski, J., et al., "Temperable Low Emissivity Coating Based on Twin Magnetron Sputtered $TiO_2$ and $Si_3N_4$ Layers", Society of Vacuum Coaters, 42nd Annual Tech. Conf. Proceedings (1999), pp. 141-146.

Szczyrbowski, J., et al., "Conventional and Temperable Low-E Coatings Based on TwinMag™ Sputtered $TiO_2$ and $Si_3N_4$ Layers", Leybold Systems GmbH, Dr. J. Szczyrbowski, PPST '99, San Diego, pp. 1-31.

Schilling, H., et al., "New Achievements in the Field of Coating Architectural Glass", Leybold Systems GmbH. Paper: Glass Processing Days, 1997, Tampere, Finland, Session 3, Glass in Modern Architectural Glass.

Hill, R., et al., "Large Area Deposition by Mid-Fequency AC Sputtering", Society of Vacuum Coaters, 41st Annual Technical Conf. Proceedings (1998), pp. 197-202.

Hillendahl J., et al., "Utilization of Silicon Targets for Reactive Sputtering From a Rotating Cylindrical DC Magnetron Cathode", Society of Vacuum Coaters, 36th Annual Tech.1 Conf. Proceedings (1993), pp. 491-494.

Thornton, John A., et al., "Sputter-Deposited $Pt-Al_2O_3$ Graded Cermet Selective Absorber Coatings", Solar Energy Materials 9 (1984) North-Holland, Amsterdam, pp. 415-431.

Beister, Guenther, et al., "Progress in large-area glass coatings by high-rate sputtering", Surface and Coatings Technology vol. 76-77 (1995), pp. 776-785.

Kloeppel, Andreas, et al., "Influence of substrate temperature and sputtering atmosphere on electrical and optical properties of double silver layer systems", Thin solid Fims vol. 392 (2001), pp. 311-314.

*Guardian Industries Corp., et al.* v. *AFG Industries, Inc.*, Case No. 03-73722, E.D. Mi.

DOUBLE SILVER LOW-EMISSIVITY AND SOLAR CONTROL COATINGS

BACKGROUND OF THE INVENTION

1. Field of the Invention

The present invention relates to low emissivity coatings. More specifically, the present invention relates to multilayer coatings for controlling thermal radiation from substrates transparent to visible light.

2. Discussion of the Background

Solar control coatings on transparent panels or substrates are designed to permit the passage of visible light while blocking infrared (IR) radiation. High visible transmittance, low emissivity coatings on, e.g., architectural glass and automobile windows can lead to substantial savings in costs associated with environmental control, such as heating and cooling costs.

Generally speaking, coatings that provide for high visible transmittance and low emissivity are made up of a stack of films. The stack includes one or more thin metallic films, with high IR reflectance and low transmissivity, disposed between anti-reflective dielectric layers. The IR reflective metallic films may be virtually any reflective metal, such as silver, copper, or gold. Silver (Ag) is most frequently used for this application due to its relatively neutral color. The anti-reflective dielectric layers are generally metal oxides selected to minimize visible reflectance and enhance visible transmittance.

Conventional low emissivity coatings generally strive to maintain reflection relatively constant throughout the visible spectrum so that the coating has a "neutral" color; i.e., is essentially colorless. However, conventional low-emissivity coatings fail to provide the extremes of reflected color required for aesthetic and other reasons by certain applications.

To achieve the desired properties in a coated substrate, the composition and thickness of each of the layers of a multilayer coating must be chosen carefully. For example, the thickness of an IR reflective layer such as Ag must be chosen carefully. It is well known that the emissivity of a Ag film tends to decrease with decreasing Ag sheet resistance. Thus, to obtain a low emissivity Ag film, the sheet resistance of the Ag film should be as low as possible. Because film surfaces and pinholes in very thin Ag films contribute to sheet resistance, increasing Ag film thickness to separate film surfaces and eliminate pinholes can decrease sheet resistance. However, increasing Ag film thickness will also cause visible transmission to decrease. It would be desirable to be able to increase visible transmission by decreasing Ag film thickness without increasing sheet resistance and emissivity.

Thin, transparent metal films of Ag are susceptible to corrosion (e.g., staining) when they are brought into contact, under moist or wet conditions, with various staining agents, such as atmosphere-carried chlorides, sulfides, sulfur dioxide and the like. To protect the Ag layers, various barrier layers can be deposited on the Ag. However, the protection provided by conventional barrier layers is frequently inadequate.

Coated glass is used in a number of applications where the coating is exposed to elevated temperatures. For example, coatings on glass windows in self-cleaning kitchen ovens are repeatedly raised to cooking temperatures of 120-230° C., with frequent excursions to, e.g., 480° C. during cleaning cycles. In addition, when coated glass is tempered or bent, the coating is heated along with the glass to temperatures on the order of 600° C. and above for periods of time up to several minutes. These thermal treatments can cause the optical properties of Ag coatings to deteriorate irreversibly. This deterioration can result from oxidation of the Ag by oxygen diffusing across layers above and below the Ag. The deterioration can also result from reaction of the Ag with alkaline ions, such as sodium (Na+), migrating from the glass. The diffusion of the oxygen or alkaline ions can be facilitated and amplified by the deterioration or structural modification of the dielectric layers above and below the Ag. Coatings must be able to withstand these elevated temperatures. However, multilayer coatings employing Ag as an infrared reflective film frequently cannot withstand such temperatures without some deterioration of the Ag film.

It would be desirable to provide low emissivity, multilayer coatings exhibiting any of a wide range of colors, along with improved chemical, thermal and mechanical stability.

SUMMARY OF THE INVENTION

The present invention provides multilayer coatings that can reduce the infrared emissivity of a substrate with minimal reduction in visible transmittance. The inventive coatings can be designed to exhibit any of a wide variety of different colors in reflection.

The multilayer coating includes, in numerical order outward from the substrate, a first layer including a layer containing titanium oxide, a layer containing silicon nitride, or a superlattice of one or more sublayer containing titanium oxide in combination with one or more sublayer containing silicon nitride; a second layer including Ag; a third layer including at least one layer selected from titanium oxide layers and silicon nitride layers; a fourth layer including Ag; and a fifth layer including silicon nitride. By varying the thicknesses of the layers of titanium oxide and silicon nitride the reflected color of the coating can be "tuned" within any one of the four color coordinate quadrants in the CIE L*a*b* color space.

When the first layer is amorphous titanium oxide, the first layer is particularly dense and provides exceptional barrier properties against oxygen and alkaline ions migrating from the substrate. In addition, amorphous titanium oxide provides an extremely smooth surface, which aids in the deposition of thinner pin-hole free Ag films with lower emissivity and higher visible transmission in the second and fourth layers.

The second and fourth layers can include a sublayer of zinc oxide, serving as a substrate for a sublayer of the Ag, and additionally a sublayer of oxidized metal deposited on the Ag sub-layer. The zinc oxide provides a substrate on which relatively thin, high electrical conductivity, Ag films preferentially grow. The sublayer of oxidized metal protects the Ag by acting as a diffusion barrier against oxygen, water and other reactive atmospheric gases, and also improves adhesion.

Incorporating oxygen and/or nitrogen into the Ag sublayers of the second and fourth layers can improve the strength and mechanical stability of the Ag sublayers.

Dividing a first layer of titanium oxide and/or silicon nitride, the Ag sublayers, and/or the third layer with a sublayer of oxidized metal can provide greater strength and mechanical stability to the divided layers during heat treatments.

The fifth layer of silicon nitride provides enhanced resistance to scratching.

In embodiments, multilayer coatings according to the present invention can undergo heat treatments, suitable to temper or bend glass, with minimal mechanical or optical degradation.

DESCRIPTION OF THE PREFERRED EMBODIMENTS

Figure 1:
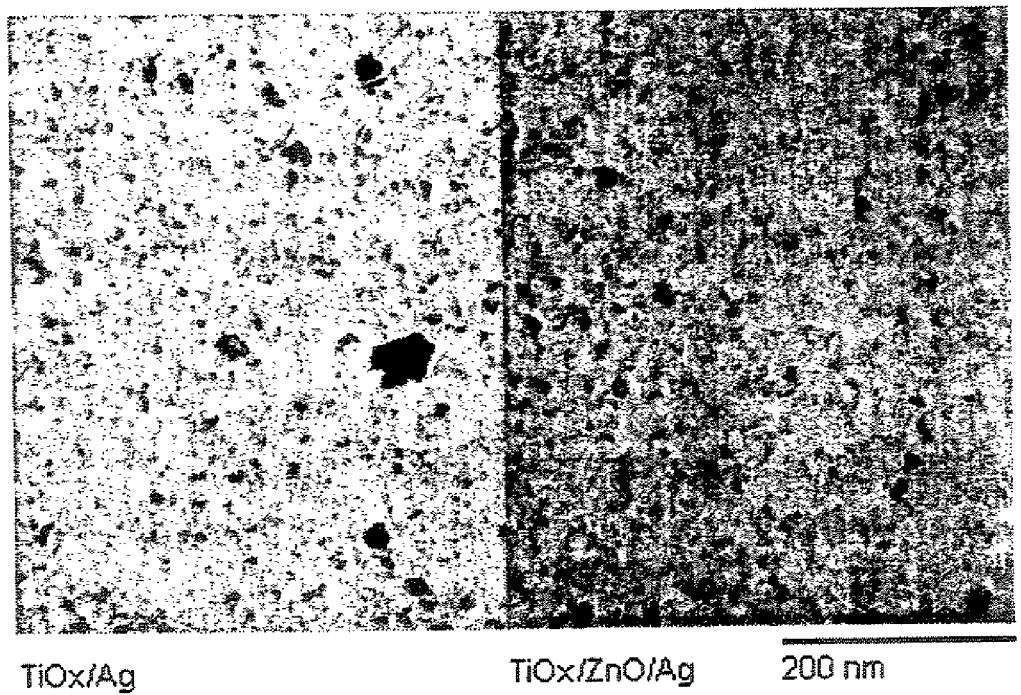
FIG. 1 shows bright field transmission electron micrographs comparing Ag deposited directly on amorphous $TiO_x$ with Ag deposited directly on ZnO (5 nm thick) resting on amorphous $TiO_x$. In both cases the amorphous $TiO_x$ was deposited on 50 nm thick, amorphous silicon nitride membranes.

The present invention provides a low emissivity multilayer coating in which the color in reflection can be varied to lie in any of the four color quadrants of the CIE L*a*b* color space. The coating can be provided with a normal emissivity of $0.02 \leq \varepsilon \leq 0.10$, a solar transmission ($T_{sol}$) of less than 45%, a solar reflection ($R_{sol}$) from either the coating or glass substrate side of greater than 28%, and CIE 1931 Yxy (Chromaticity) transmission and reflection (from either the coating or glass side) greater than 75% and less than 7%, respectively.

An embodiment of the low-emissivity coating of the present invention appears in Table 1:

TABLE 1

| Layer | Material |
| --- | --- |
| 5 | silicon nitride |
| 4 | Ag |
| 3 | titanium oxide; silicon nitride; or superlattice of titanium oxide and silicon nitride |
| 2 | Ag |
| 1 | titanium oxide and/or silicon nitride layers |
| 0 | substrate |

The coating is deposited on a substrate, and includes, in numerical order outward from the substrate, a first layer including a layer containing titanium oxide, a layer containing silicon nitride, or a superlattice of one or more sublayer containing titanium oxide in combination with one or more sublayer containing silicon nitride; a second layer including Ag; a third layer including at least one layer selected from titanium oxide layers and silicon nitride layers; a fourth layer including Ag; and a fifth layer including silicon nitride. The multiple layers of silver in the low emissivity coating of the present invention provide greater efficiency in reflecting IR radiation, and a sharper cut-off between transmitted and reflected wavelengths, than is possible with a single layer of silver.

Layer 0 is the substrate. The multilayer coating of the present invention is deposited on and is mechanically supported by the substrate. The substrate surface serves as a template for the coating, and influences the surface topography of the coating. To maximize transmission of visible light, preferably the surface of the substrate has a roughness less than the wavelength of the light. Such a smooth surface can be formed by, e.g., solidifying a melt of the substrate. The substrate can be any material having an emissivity that can be lowered by the multilayer coating of the present invention. For architectural and automotive applications, the substrate is preferably a material which has superior structural properties and minimum absorption in the visible and near-infrared spectra regions where the solar energy is concentrated. Crystalline quartz, fused silica, soda-lime silicate glass and plastics, e.g., polycarbonates and acrylates, are all preferred substrate materials.

Layer 1 promotes adhesion between the coating and the substrate; serves as a barrier to oxygen and alkaline ions (e.g., $Na^+$) migrating from the substrate to the coating; influences the surface roughness of the coating; and promotes the transmission of visible light through the coating. The present inventors have discovered that titanium oxide and silicon nitride are both well suited to these functions.

Titanium oxide is particularly well suited for layer 1. The titanium oxide is preferably a dielectric and electrically insulating. The titanium oxide of layer 1 can be $TiO_x$, where x ranges from 1 to 2. The titanium oxide can be sputtered in a variety of phases: e.g., as rutile and anatase polycrystalline phases, and as an amorphous phase. Anatase and rutile layers provide higher indices of refraction, making it possible to attain higher visible transmission. However, preferably the titanium oxide is amorphous, because amorphous titanium oxide forms a denser layer than other metal oxides and provides a superior barrier to oxygen and alkaline ions diffusing from the substrate. In addition, because an amorphous layer of titanium oxide is smoother than a polycrystalline layer, the amorphous layer of titanium oxide permits thinner continuous films of infrared reflective Ag to be deposited than does a polycrystalline film. An amorphous titanium oxide layer can be formed by DC, AC, or RF magnetron sputtering under conditions well known in the art.

The silicon nitride of layer 1 can be $SiN_x$, where x varies from greater than 0 to 1.34. When x=1.34 in $SiN_x$, the silicon nitride is stoichiometric $Si_3N_4$.

The titanium oxide of layer 1 has a higher index of refraction (approximately 2.4 at 550 nm) compared with silicon nitride (greater than 1.9 at 550 nm) and many other oxides. Thus, the titanium oxide promotes transmission and reduces reflection of light to a greater extent than these other materials. As a result of titanium oxide's higher index of refraction, a similar optical behavior in layer 1 can be achieved using a thinner layer of titanium oxide than of the other materials. Alternatively, by replacing a conventional oxide in layer 1 with titanium oxide of equal thickness the thickness of subsequent IR reflective silver layers in a coating can be increased without reducing visible transmittance of the coating.

When present in layer 1, the titanium oxide can have a thickness in the range of about 5 to 30 nm, preferably 5 to 20 nm, more preferably 5 to 15 nm. If the titanium oxide film is less than 5 nm thick, then the film fails to block migration of oxygen and alkaline ion impurities from the substrate. If the titanium oxide film is thicker than 30 nm, then the film tends to block transmission of visible light. Most preferably, the titanium oxide of layer 1 is about 10 nm thick.

When present in layer 1, the silicon nitride can have a thickness in a range from 5 to 30 nm, preferably 5 to 20 nm, more preferably 5 to 15 nm. The silicon nitride can enhance the barrier properties and also influence the optical properties of the coating when a sufficient thickness of silicon nitride is present.

Layer 2 is designed to reflect IR radiation. To accomplish this task, while retaining the possibility of a relatively neutral color in reflection, layer 2 is formed primarily from Ag. The Ag of layer 2 can have a thickness in the range of about 8 to 16 nm, preferably 8 to 14 nm, more preferably 10 to 14 nm, most preferably about 12 nm.

Layer 3 includes one or more anti-reflective layers to enhance visible transmission. The anti-reflective layers are dielectric materials and electrically insulating. Preferably, the dielectric materials are selected from titanium oxide and silicon nitride. The titanium oxide can be $TiO_x$, where x varies from greater than 1 to 2, and is preferably amorphous. The silicon nitride can be $SiN_x$, where x varies from greater than 0 to 1.34. When x=1.34 in $SiN_x$, the silicon nitride is stoichiometric $Si_3N_4$. Preferably, layer 3 is $Si_3N_4$. Because titanium oxide has a higher index of refraction than silicon nitride, the same optical behavior can be obtained using a thinner layer of titanium oxide than silicon nitride. On the other hand, silicon nitride provides greater mechanical stability than titanium oxide during heat treatments, and thus greater heat treatability. The combination of silicon nitride with titanium oxide in a superlattice provides both the optical advantages of the higher index of refraction of titanium oxide and the thermal and mechanical stability advantages associated with silicon nitride. The higher average index of refraction of the titanium oxide/silicon nitride superlattice relative to silicon nitride alone permits a higher visible, photopic, transmission for the same Ag thickness, or a similar photopic transmission for an increased number of stabilizing barrier layers. The thickness of layer 3 can be from 45 to 90 nm, and is preferably about 63 nm. When layer 3 includes a superlattice of titanium oxide and silicon nitride, the layers in the superlattice can each have a thickness of from 1 to 45 nm.

Layer 4 is designed to reflect IR radiation. To accomplish this task, while retaining the possibility of a relatively neutral color in reflection, layer 4 is formed primarily from Ag. The Ag of layer 4 can have a thickness in the range of about 8 to 24 nm, preferably 10 to 20 nm, more preferably 12 to 18 nm, most preferably about 16 nm thick.

If the sum of the Ag thicknesses in layers 2 and 4 is less than about 16 nm, insufficient infrared radiation will be reflected by the multilayer coating. If the sum of the Ag layer thicknesses in layers 2 and 4 is more than about 40 nm, the visible transmission will be reduced to unacceptable levels.

Layer 5 serves to protect the multilayer coating of the invention from scratches and abrasion; improves heat treatability of the coating; acts as a barrier to oxygen and other chemicals in the environment; and influences the optical properties of the low-emissivity coating. Preferably, layer 5 is silicon nitride. The silicon nitride can be $SiN_x$, where x varies from greater than 0 to 1.34. The thickness of the silicon nitride of layer 5 is from 25 to 60 nm, and is preferably about 35 nm.

In embodiments of the present invention, layer 1 can include, in addition to a sublayer of titanium oxide, a sublayer of silicon nitride, thus forming a superlattice of titanium oxide and silicon nitride. The term "superlattice" as used herein refers to any number of alternating titanium oxide and silicon nitride layers, including a titanium oxide/silicon nitride bilayer. Suitable structures are shown in Tables 2-3. The silicon nitride can enhance the barrier properties achieved using titanium oxide and also influence the optical properties of the coating when a sufficient thickness of silicon nitride is present. In the superlattice each of the titanium oxide sublayers and the silicon nitride sublayers can be from 1 to 30 nm thick.

TABLE 2

| Sub-layer | Material |
|---|---|
| 1b | silicon nitride |
| 1a | titanium oxide |

TABLE 3

| Sub-layer | Material |
|---|---|
| 1b | titanium oxide |
| 1a | silicon nitride |

In other embodiments of the present invention, the Ag of one or more of layers 2 and 4 can include oxygen and/or nitrogen. The incorporation of oxygen and/or nitrogen in the Ag improves the thermal and mechanical stability of the Ag. The oxygen and/or nitrogen can be distributed homogeneously throughout the Ag of a layer, or can be segregated to a portion of the Ag of a layer. The oxygen and/or nitrogen can incorporated into the Ag by adding oxygen and/or nitrogen to the inert gas used to sputter deposit the Ag. When the Ag including the oxygen and/or nitrogen is DC, AC or RF reactively sputtered, the amount of oxygen and/or nitrogen in the inert gas can range from greater than 0 to 20%.

In still other embodiments of the present invention, layers 2 and 4 can include, in addition to a sublayer of Ag, a sublayer of zinc oxide and a sublayer of an oxidized metal. As shown in Tables 4-5, the zinc oxide sublayer serves as a substrate for the sublayer of Ag, and the sublayer of Ag serves as a substrate for the sublayer of an oxidized metal. The sublayer of an oxidized metal protects the Ag from reactive materials such as oxygen in the environment.

TABLE 4

| Sub-layer | Material |
|---|---|
| 4c | oxidized metal |
| 4b | Ag |
| 4a | zinc oxide |
| 3 | titanium oxide; silicon nitride; or superlattice of titanium oxide and silicon nitride |

TABLE 5

| Sub-layer | Material |
|---|---|
| 2c | oxidized metal |
| 2b | Ag |
| 2a | zinc oxide |
| 1 | titanium oxide and/or silicon nitride layers |

The sublayer of zinc oxide that can be in layers 2 and 4 is generally polycrystalline. The zinc oxide can be ZnO. The present inventors have discovered that, when deposited on amorphous titanium oxide, zinc oxide is particularly useful as a substrate for growing low sheet resistance, strongly adherent Ag layers. The amorphous titanium oxide, as discussed above, provides an extremely smooth surface on which to grow subsequent layers. The zinc oxide grows with the {0001} orientation, which orients the Ag to preferentially grow with a {111} orientation. The epitaxial lattice match between Ag {111} and ZnO {0001} leads to lower sheet resistance and improved adhesion of the Ag. The use of zinc oxide as a substrate for Ag instead of another material lowers the Ag sheet resistance by approximately 1 Ω/□. The net result of using zinc oxide as a substrate for Ag is a decrease in emissivity without lowering the visible, photopic transmission. The zinc oxide provides a means for forming a high conductivity, strongly adherent Ag layer with a thickness as low as 8 nm.

Another interesting finding associated with the use of a sublayer of zinc oxide is that the transmitted a* value increases by about one color point (e.g., from a*=−3.0 to a*=−2.0) and the photopic transmission increases about +1.5% per zinc oxide layer added up to a maximum enhancement of up to +3%. These effects vary as the thickness of the zinc oxide changes.

In embodiments, the zinc oxide can include nitrogen and can be represented by the formula $ZnO_xN_y$. The nitrogen containing zinc oxide can be formed by sputtering a Zn target in a sputtering gas including 33 to 84%, preferably 43 to 80%, $O_2$; 1 to 25%, preferably 3 to 14%, $N_2$; and a remainder of argon. A coater manufactured by Leybold Systems GmbH with model number Typ A 2540 Z 5 H/20-29 is suitable for sputter depositing the nitrogen containing zinc oxide, using gas flows of 200 to 600 sccm, preferably 300 to 450 sccm $O_2$; 10 to 100 sccm, preferably 25 to 50 sccm $N_2$; and 100 to 300 sccm Ar. The addition of nitrogen to the zinc oxide improves the thermal stability of the layered coatings of the present invention.

The sublayer of zinc oxide can have a thickness in the range of about 1 to 20 nm, preferably about 6-7 nm. If the zinc oxide is too thick, the sheet restant of the Ag will begin to increase. By limiting zinc oxide underlayer thickness to 20 nm and less, the zinc oxide allows for the deposition of pinhole-free, low sheet resistance Ag films at lower thicknesses than are possible with other substrates, while minimizing the undesirable characteristic of thick zinc oxide. Because thin zinc oxide enables thinner Ag films to be used, which enhances visible transmission, use of thin zinc oxide leads to enhancements in the visible transmission of low emissivity coatings.

The sublayer of oxidized metal in layers 2 and 4 protects the Ag sublayer from corroding by acting as a diffusion barrier against oxygen, water and other reactive atmospheric gases. In addition, the sublayer of oxidized metal improves adhesion between layers in the multilayer coating. Preferably, the sublayer of oxidized metal is an oxidized metal such as oxidized Ti, oxidized W, oxidized Nb, and oxidized Ni—Cr alloy. Different advantages and disadvantages are associated with each of the barrier layers. Some of the barrier layers provide particularly high thermal and mechanical durability, while others particularly benefit color and/or photopic transmission and reflection. For example, an at least partially oxidized Ni—Cr alloy (e.g., $NiCrO_y$, where 0<y<2) provides particularly good heat treatability characteristics to a multilayer coating, enhancing the thermal and mechanical durability of a coating during heat treatments above 700° C., such as those necessary for bending and tempering a glass substrate. Preferably the oxidized metal is a suboxide near the metal insulator transition. Such a suboxide will generally have an oxygen content less than the stoichiometric amount of oxygen in the fully oxidized metal. The suboxide will be able to react with, and thus block diffusion of, additional oxygen and other reactive gases. The oxidized metal sublayer can have a thickness in the range of 2 to 8 nm, more preferably 4 to 6 nm, most preferably about 5 nm thick. The sublayer of oxidized metal is preferably formed by reactively sputtering a metal target in a sputtering gas including an inert gas and 10 to 75%, preferably 20 to 55%, oxygen.

In further embodiments of the present invention, the thermal and mechanical stability of various layers can be improved by dividing each of the layers with a layer of the oxidized metal. The layer of oxidized metal strengthens the layers against thermally induced changes. For example, the titanium oxide and/or silicon nitride layers of layer 1 can be divided by a layer of oxidized metal. In addition, at least one of the Ag sublayers in layers 2 and 4 can be divided by a layer of oxidized metal. Furthermore, at least a portion of the titanium oxide in layer 3 can be divided by a layer of oxidized metal. Preferably, the layer of oxidized metal is an at least partially oxidized Ni—Cr alloy (e.g., $NiCrO_y$, where 0<y<2). The oxidized metal provides improved mechanical stability to the divided layers during heat treatments.

The layers in the multilayer coatings of the present invention can be deposited by conventional physical and chemical vapor deposition techniques. The details of these techniques are well known in the art and will not be repeated here. Suitable deposition techniques include sputtering methods. Suitable sputtering methods include DC sputtering, using metallic targets, and AC and RF sputtering, using metallic and non-metallic targets. All can utilize magnetron sputtering. The sputtering can be in an inert gas, or can be carried out reactively in reactive gas. The total gas pressure can be maintained in a range from $5 \times 10^{-4}$ to $8 \times 10^{-2}$ mbar, preferably from $1 \times 10^{-3}$ to $1 \times 10^{-2}$ mbar. Sputtering voltages can be in a range from 200 to 1200 V, preferably 250 to 1000 V. Dynamic deposition rates can be in a range of from 25 to 700 nm-mM²/W-sec, preferably 30 to 700 nm-mm²/W-sec. Coaters manufactured by Leybold Systems GmbH with model numbers Typ A 2540 Z 5 H/13-22 and Typ A 2540 Z 5 H/20-29 are suitable for sputter depositing the multilayer coatings of the present invention.

EXAMPLES

To further illustrate the invention, the following non-limiting examples are provided:

Example 1

As discussed above, a sublayer of zinc oxide deposited on amorphous titanium oxide promotes the wetting of Ag on the zinc oxide and the formation of thinner layers of pin-hole free Ag.

To demonstrate this, Ag films 16 nm thick were planar DC magnetron sputter deposited onto amorphous $TiO_x$ (a-$TiO_x$) underlayers 25 nm thick, and also onto ZnO (5 nm)/a-$TiO_x$ (25 nm) under(bi)layers. Transmission electron diffraction micrographs of the amorphous $TiO_x$ showed only broad diffuse rings, indicating that the $TiO_x$ was amorphous. The ZnO and a-$TiO_x$ dielectric layers were reactively sputtered from metal targets. The substrates for the a-$TiO_x$ layers included glass, and transmission electron microscopy (TEM) grids each having a 50 nm thick, amorphous, silicon nitride, electron transparent membrane peripherally supported by Si. The membrane was formed in a manner well known in the art by depositing silicon nitride by LPCVD (liquid phase chemical vapor deposition) onto a Si wafer, and then back-etching the Si.

FIG. 1 shows bright field transmission electron micrographs comparing Ag deposited directly on the a-TiO$_x$ with Ag deposited directly onto the ZnO resting on a-TiO$_x$. The Ag grown directly on the a-TiO$_x$ has an abnormal microstructure with irregular grains. The Ag grown directly on the ZnO has a more normal microstructure with regular grains. The average normal grain size of the Ag directly on the ZnO is about 25 nm, while that of the Ag directly on the a-TiO$_x$ is about 15 nm.

Figure 2:
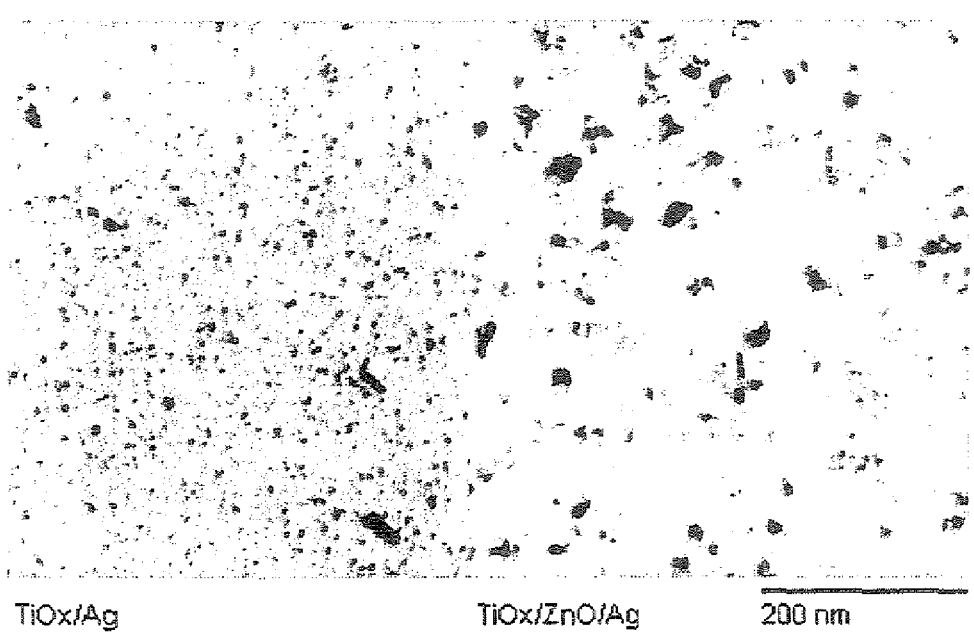
FIG. 2 shows dark field transmission electron micrographs comparing Ag deposited directly on amorphous $TiO_x$ with Ag deposited directly on ZnO (5 nm thick) resting on amorphous $TiO_x$.

FIG. 2 shows dark field transmission electron negative micrographs comparing the Ag deposited directly on the a-TiO$_x$ with the Ag deposited directly on the ZnO resting on TiO$_x$. The dark field images were obtained using {220} Ag reflections. The images show that {111} oriented Ag grains giving rise to the strong 220 reflections have a significantly larger average grain size (two to three times larger) when deposited directly on the 5 nm thick ZnO than when deposited directly on a-TiO$_x$.

Figure 3:
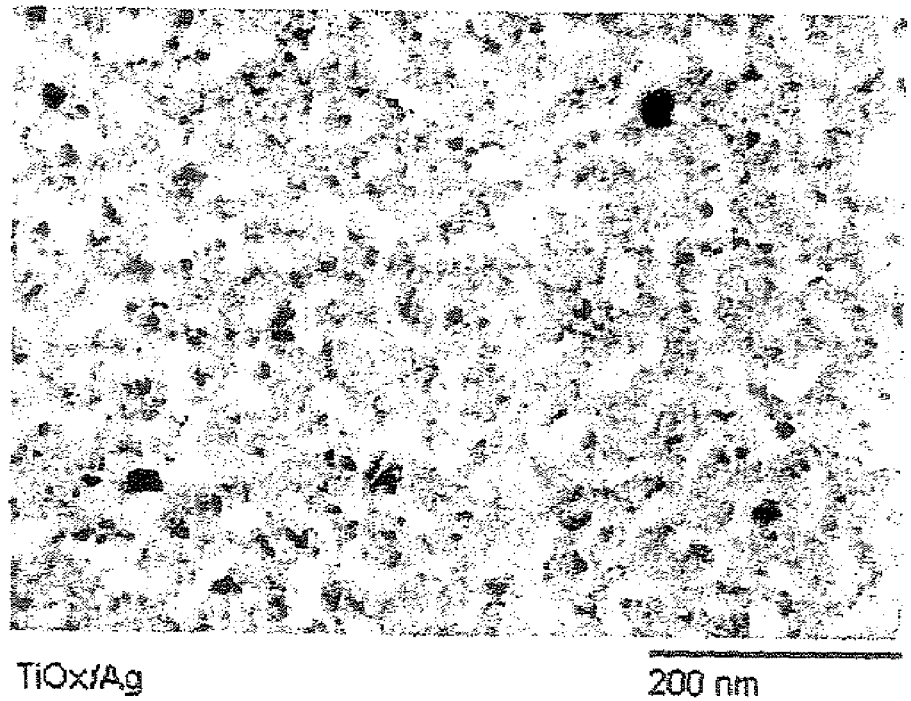
FIG. 3 is a transmission electron micrograph showing a discontinuous layer of Ag, containing pinholes, deposited on amorphous $TiO_x$.

FIG. 3 shows is a bright field transmission electron micrograph of Ag deposited directly the a-TiO$_x$ underlayer near the center of the TEM grid. The Ag film near the center of the TEM grid is clearly discontinuous. A grayish haze was observed by eye near the center of the grid from the scattering of light from the rough surface. In contrast, the Ag film near the membrane supportive, back-etched Si was free of pinholes and continuous. The discontinuous Ag film containing pinholes is believed to result from increased deposition temperatures at the center of the membrane due to thermal isolation. Remarkably, the Ag deposited directly on 5 nm thick ZnO was continuous over the entire TEM grid, even in places where Ag deposited directly on a-TiO$_x$ was discontinuous.

The sheet resistance of the Ag films, measured when deposited on substrates of bulk glass, was found to be 5.68 Ω/□ with the ZnO/a-TiO$_x$ under(bi)layer and 7.56 Ω/□ with the a-TiO$_x$, underlayer. Since there was no visual haze, and the films deposited on glass were on a heat sink even larger than the TEM grid edge, it is expected that the Ag films were continuous and pinhole free on the glass.

Thus, zinc oxide provides an underlayer on which Ag preferentially grows as a pinhole free, continuous film. Furthermore, the sheet resistance of the Ag film can be reduced without an increase in Ag thickness. The addition of zinc oxide was observed to decrease the Ag sheet resistance by approximately 1 Ω/□.

Example 2

A complex structure incorporating many of the features of the present invention appears in Table 6.

TABLE 6

| Layer | Material* |
|---|---|
| 5 | SiN$_x$ |
| 4c(2) | NiCrO$_x$ |
| 4b(2) | Ag |
| 4c(1) | NiCrO$_x$ |
| 4b(1) | Ag |
| 4a | ZnO$_x$ |
| 3c | TiO$_x$ |
| 3b | NiCrO$_x$ |
| 3a | TiO$_x$, SiN$_x$, or superlattice |
| 2c(2) | NiCrO$_x$ |
| 2b(2) | Ag |
| 2c(1) | NiCrO$_x$ |
| 2b(1) | Ag |
| 2a | ZnO$_x$ |
| 1a(2) | TiO$_x$ |
| 1b | NiCrO$_x$ |
| 1a(1) | TiO$_x$, SiN$_x$, or superlattice |
| 0 | glass substrate |

*In Table 6, the subscript "x" indicates both stoichiometic and sub-stoichiometric compositions.

Various multilayer coatings including all, or a portion, of the layers shown in Table 6 were made by DC magnetron sputtering.

It was found that by varying the thicknesses of the silicon nitride and titanium oxide layers the reflected color of the coating can be positioned in any of the four color coordinate quadrants of the CIE 1976 L*a*b* (CIELAB) and CIE 1931 Yxy (Chromaticity) color spaces. Techniques and standards for quantifying the measurement of color are well known to the skilled artisan and will not be repeated here.

Figure 4:
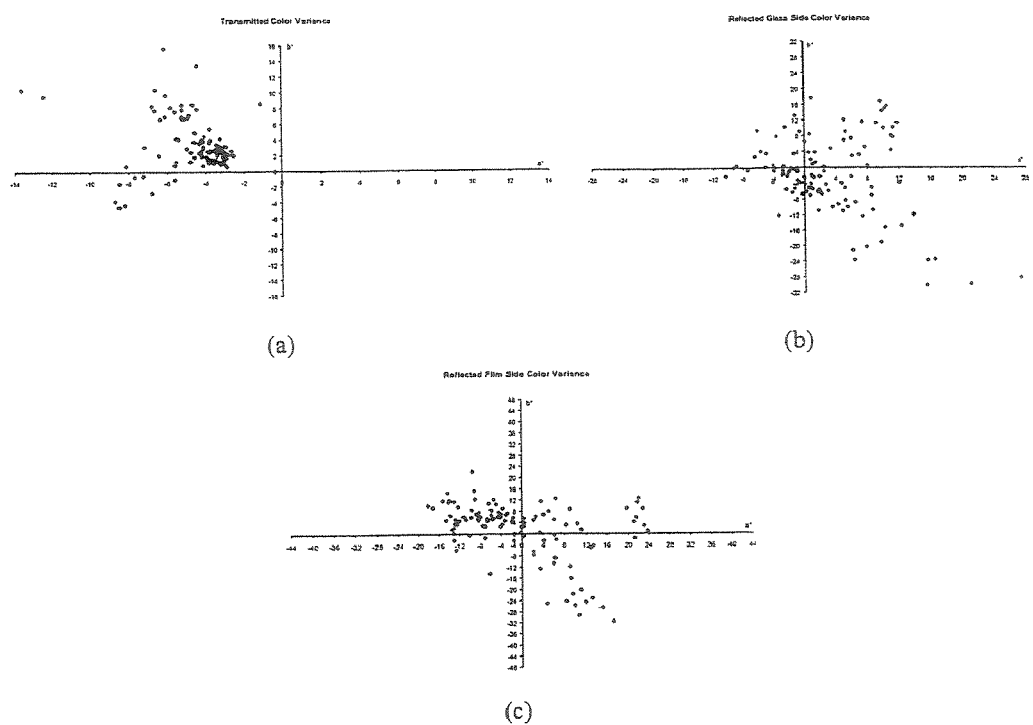
FIG. 4a shows CIE 1976 L*a*b* (CIELAB) transmitted color variations from multilayer coatings on glass substrates resulting from changes in layer thicknesses.
FIG. 4b shows CIE 1976 L*a*b* (CIELAB) reflected glass side color variations from multilayer coatings on glass substrates resulting from changes in layer thicknesses.
FIG. 4c shows CIE 1976 L*a*b* (CIELAB) reflected coating side color variations from multilayer coatings on glass substrates resulting from changes in layer thicknesses.

FIGS. 4a-4c show transmitted, reflected glass side and reflected film side color variance for the various multilayer coatings. As with conventional structures, color neutrality (colorless) was achieved with some of the coatings. FIG. 4a shows that the transmitted color varied dramatically in the second quadrant. FIGS. 4b and 4c show that the coatings can produce reflected color in any of the four color coordinate quadrants of the CIE 1976 L*a*b* (CIELAB) and CIE 1931 Yxy (Chromaticity) color spaces.

The photopic transmission and reflection of the various coatings varied with changes in the thickness of the silicon nitride and titanium oxide. The photopic transmission varied from about 50 to 80%. The reflection from the glass side varied from about 5% to 22%. The reflection from the coated side varies from about 3% to about 20%.

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A low-emissivity coating on a substrate, the coating comprising, in numerical order outward from the substrate,
   a first layer including at least one layer selected from titanium oxide layers and silicon nitride layers;
   a second layer including Ag;
   a third layer including at least one layer selected from titanium oxide layers and silicon nitride layers;
   a fourth layer including Ag; and
   a fifth layer including silicon nitride, wherein
   at least one of the second layer and the fourth layer comprises
   a sublayer including Ag, and
   a sublayer consisting of a fully oxidized Ni—Cr alloy directly on, and outward from the substrate from, the Ag of the sublayer including Ag.

2. The coating according to claim 1, wherein the first layer is from 5 to 30 nm thick.

3. The coating according to claim 1, wherein
   the first layer includes a titanium oxide layer; and
   the titanium oxide in the first layer is amorphous.

4. The coating according to claim 1, wherein the third layer comprises at least one of a $TiO_2$ layer and a $Si_3N_4$ layer.

5. The coating according to claim 1, wherein the third layer comprises a superlattice of titanium oxide and silicon nitride.

6. The coating according to claim 1, wherein at least one of the second layer and the fourth layer consists of, in numerical order outward from the substrate,
   a first sublayer, which includes a zinc oxide;
   a second sublayer, which includes Ag; and
   a third sublayer, which includes a fully oxidized Ni—Cr alloy.

7. The coating according to claim 6, wherein the zinc oxide comprises nitrogen.

8. The coating according to claim 1, wherein the Ag in at least one of the second layer and the fourth layer further comprises at least one of oxygen and nitrogen.

9. The coating according to claim 1, wherein the Ag in at least one of the second layer and the fourth layer further comprises a means for strengthening the Ag against thermally induced changes.

10. The coating according to claim 1, wherein at least one of the first layer, the second layer, the third layer, and the fourth layer is divided by a layer of an oxidized metal.

11. The coating according to claim 10, wherein the oxidized metal is an at least partially oxidized Ni—Cr alloy.

12. The coating according to claim 1, wherein at least one layer of the first layer, the second layer, the third layer, and the fourth layer is divided by a layer including a means for strengthening the at least one layer against thermally induced changes.

13. The coating according to claim 1, wherein the silicon nitride comprises less than a stoichiometric amount of nitrogen.

14. The coating according to claim 1, wherein
    the first layer includes a layer of $SiN_x$, where $0<x\leq1.34$;
    the third layer includes a layer of $SiN_x$, where $0<x\leq1.34$; and
    the fifth layer includes a layer of $SiN_x$, where $0<x\leq1.34$.

15. The coating according to claim 14, wherein the first layer includes a layer of $SiN_x$, where $x=1.34$.

16. A method of making a low-emissivity coating on a substrate, the method comprising
    depositing at least one layer including Ag on the substrate; and
    producing the coating of claim 1.

17. The method according to claim 16, wherein the depositing comprises sputtering.

18. A method of making a low-emissivity coating on a substrate, the method comprising
    a step for depositing at least one layer including Ag on the substrate; and
    producing the coating of claim 1.

19. A low-emissivity coating on a substrate, the coating comprising, in numerical order outward from the substrate,
    a first layer including at least one layer selected from titanium oxide layers and silicon nitride layers;
    a second layer including a first means for reflecting infrared radiation;
    a third layer having an index of refraction greater than or equal to 1.9 at a wavelength of 550 nm;
    a fourth layer including a second means for reflecting infrared radiation; and
    a fifth layer including a means for protecting the coating from abrasion, wherein
    at least one of the first means for reflecting infrared radiation and the second means for reflecting infrared radiation comprises
      a sublayer including Ag, and
      a sublayer consisting of a fully oxidized Ni—Cr alloy directly on, and outward from the substrate from, the Ag of the sublayer including Ag.

20. The coating according to claim 19, wherein
    at least one of the first means for reflecting infrared radiation and the second means for reflecting infrared radiation consists of, in numerical order outward from the substrate, a first sublayer, a second sublayer, which includes Ag, and a third sublayer, which includes a fully oxidized Ni—Cr alloy; and
    the first sublayer includes a means for preferentially orienting a crystal structure of the second sublayer.

21. The coating according to claim 19, wherein
    at least one of the first means for reflecting infrared radiation and the second means for reflecting infrared radiation consists of, in numerical order outward from the substrate, a first sublayer, a second sublayer including Ag, and a third sublayer;
    the first sublayer includes a zinc oxide; and
    the third sublayer includes a means for preventing the Ag in the second sublayer from corroding.

22. The coating according to claim 21, wherein the zinc oxide comprises nitrogen.

23. A low-emissivity coating on a transparent substrate, the coating comprising, in numerical order outward from the substrate,
    a first layer including at least one layer selected from titanium oxide layers and silicon nitride layers;
    a second layer including a zinc oxide;
    a third layer including Ag;
    a fourth layer consisting of a first fully oxidized Ni—Cr alloy directly on the Ag of the third layer;
    a fifth layer including at least one layer selected from titanium oxide layers and silicon nitride layers;
    a sixth layer including a zinc oxide;
    a seventh layer including Ag;
    an eighth layer consisting of a second fully oxidized Ni—Cr alloy directly on the Ag of the seventh layer; and
    a ninth layer including silicon nitride.

24. The coating according to claim 22, wherein
    the first layer includes a layer of $SiN_x$, where $0<x\leq1.34$;
    the fifth layer includes a layer of $SiN_x$, where $0<x\leq1.34$; and
    the ninth layer includes a layer of $SiN_x$, where $0<x\leq1.34$.

25. The coating according to claim 24, wherein the first layer includes a layer of $SiN_x$, where $x=1.34$.

* * * * *

UNITED STATES PATENT AND TRADEMARK OFFICE
CERTIFICATE OF CORRECTION

PATENT NO. : 7,632,572 B2  Page 1 of 1
APPLICATION NO. : 11/745243
DATED : December 15, 2009
INVENTOR(S) : Darin Glenn et al.

It is certified that error appears in the above-identified patent and that said Letters Patent is hereby corrected as shown below:

Column 3, line 38, "$0.02 \leqq \in \leqq 0.10$" should read --$0.02 \leq \in \leq 0.01$--

Claim 14, "$0 < x \leqq 1.34$" should read --$0 < x \leq 1.34$--

Claim 24, should read --The coating according to Claim 22, wherein the first layer includes a layer of $SiN_x$, where $0 < x \leq 1.34$;

the third layer includes a layer of $SiN_x$, where $0 < x \leq 1.34$; and the fifth layer includes a layer of $SiN_x$, where $0 < x \leq 1.34$.--

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,632,572 B2
APPLICATION NO. : 11/745243
DATED : December 15, 2009
INVENTOR(S) : Darin Glenn et al.

It is certified that error appears in the above-identified patent and that said Letters Patent is hereby corrected as shown below:

Column 3, line 38, "$0.02 \leqq \in \leqq 0.10$" should read --$0.02 \leq \in \leq 0.01$--

Claim 14, Column 11, lines 35, 36, and 38, "$0 < x \leqq 1.34$" should read --$0 < x \leq 1.34$--

Claim 24, Column 12, lines 50-54, should read --The coating according to Claim 22, wherein the first layer includes a layer of $SiN_x$, where $0 < x \leq 1.34$;

the third layer includes a layer of $SiN_x$, where $0 < x \leq 1.34$; and the fifth layer includes a layer of $SiN_x$, where $0 < x \leq 1.34$.--

This certificate supersedes the Certificate of Correction issued August 17, 2010.

Signed and Sealed this

Fourteenth Day of September, 2010

David J. Kappos
*Director of the United States Patent and Trademark Office*